US012311462B2

(12) United States Patent
Lev et al.

(10) Patent No.: US 12,311,462 B2
(45) Date of Patent: May 27, 2025

(54) LASER ASSISTED MACHINING OF SHEET MATERIAL

(71) Applicant: IPG PHOTONICS CORPORATION, Oxford, MA (US)

(72) Inventors: Leonid C. Lev, Bloomfield, MI (US); Steffen Mueller, Plymouth, MI (US)

(73) Assignee: IPG PHOTONICS CORPORATION, Marlborough, MA (US)

( * ) Notice: Subject to any disclaimer, the term of this patent is extended or adjusted under 35 U.S.C. 154(b) by 214 days.

(21) Appl. No.: 17/047,153

(22) PCT Filed: Apr. 12, 2019

(86) PCT No.: PCT/US2019/027363
§ 371 (c)(1),
(2) Date: Oct. 13, 2020

(87) PCT Pub. No.: WO2019/200339
PCT Pub. Date: Oct. 17, 2019

(65) Prior Publication Data
US 2021/0162534 A1 Jun. 3, 2021

Related U.S. Application Data

(60) Provisional application No. 62/657,242, filed on Apr. 13, 2018.

(51) Int. Cl.
*B23K 26/00* (2014.01)
*B21D 1/02* (2006.01)
(Continued)

(52) U.S. Cl.
CPC ............ *B23K 26/0093* (2013.01); *B21D 1/02* (2013.01); *B21D 28/10* (2013.01); *B23K 26/082* (2015.10);
(Continued)

(58) Field of Classification Search
CPC .............. B23K 26/0093; B23K 26/082; B23K 26/364; B23K 26/40; B23K 2103/04; B21D 1/02
See application file for complete search history.

(56) References Cited

U.S. PATENT DOCUMENTS 4,285,754 A * 8/1981 DiMatteo ............... B21D 28/22
29/415
4,356,377 A * 10/1982 Norton ................. H02K 15/026
219/121.17

(Continued)

FOREIGN PATENT DOCUMENTS

KR 10-1528182 6/2015

*Primary Examiner* — Jeffrey T Carley
*Assistant Examiner* — Dilnessa B Belay
(74) *Attorney, Agent, or Firm* — Caroline J. Roush, Esq.

(57) ABSTRACT

A system and process for fabricating components from sheet material. Various embodiments of the disclosure combine punching of components from sheet material with a scoring process that outlines the components prior to the punching operation. In addition, a system and process where the scored portion of the sheet material that includes the scored outline is subjected to a high compression flattening process prior to the punching operation is disclosed. Performing the flattening operation prior to the punching operation has the effect of streamlining the process. That is, the sheet material can be easily handled and conveyed from the scoring process, through the flattening process, and to the punching process without need for separate handling of the component.

9 Claims, 9 Drawing Sheets

(51) Int. Cl.
*B21D 28/10* (2006.01)
*B23K 26/082* (2014.01)
*B23K 26/364* (2014.01)
*B23K 26/40* (2014.01)
*B23K 101/16* (2006.01)
*B23K 103/04* (2006.01)

(52) U.S. Cl.
CPC ............ *B23K 26/364* (2015.10); *B23K 26/40* (2013.01); *B23K 2101/16* (2018.08); *B23K 2103/04* (2018.08)

(56) References Cited

U.S. PATENT DOCUMENTS

| | | |
|---|---|---|
| 7,584,639 B2 | 9/2009 | Boultshouser |
| 2002/0000031 A1 | 1/2002 | Rosasco et al. |
| 2007/0221024 A1 | 9/2007 | Negishi et al. |
| 2013/0320019 A1 | 12/2013 | Tinoco et al. |
| 2016/0308425 A1* | 10/2016 | Bauer .................... B23K 26/38 |
| 2017/0047829 A1* | 2/2017 | Hasuo .................. H02K 15/022 |

* cited by examiner

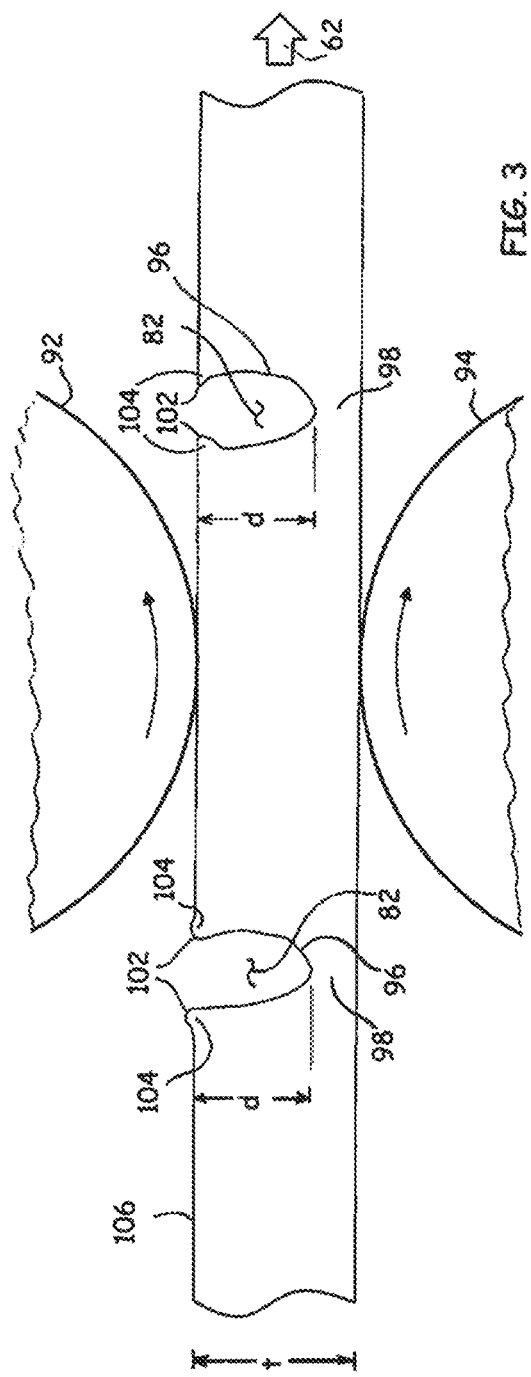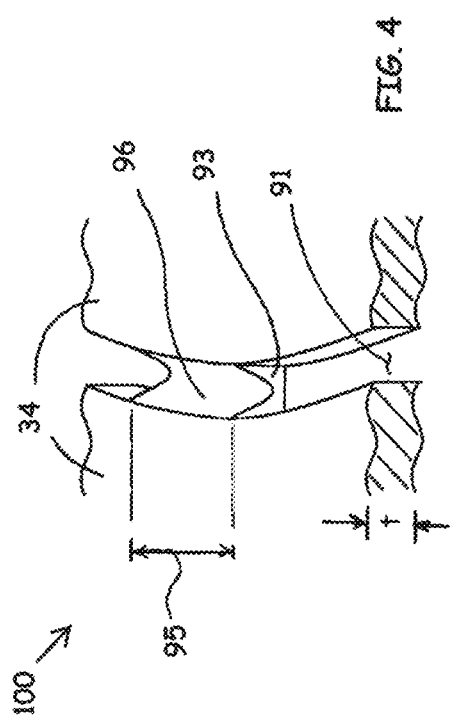

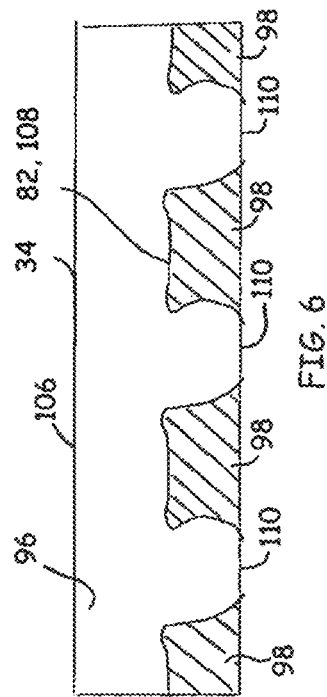
FIG. 5
FIG. 6
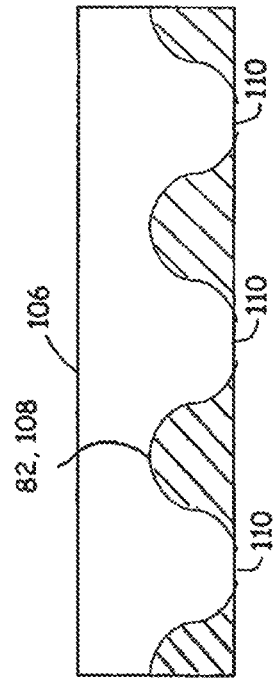
FIG. 8
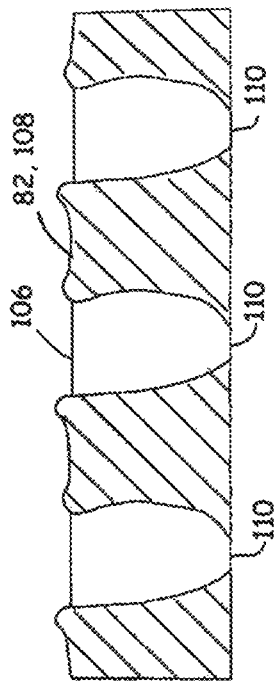
FIG. 7

LASER ASSISTED MACHINING OF SHEET MATERIAL

RELATED APPLICATIONS

This application claims the benefit of U.S. Provisional Application No. 62/657,242, filed Apr. 13, 2018, the disclosure of which is incorporated by reference herein in its entirety.

FIELD OF THE DISCLOSURE

This application is directed generally to methods and systems for fabricating components from sheet stock, and more specifically laser machining of sheet stock in tool and die fabrication processes and systems.

BACKGROUND OF THE DISCLOSURE

A wide range of sheet metal parts are manufactured by stamping and punching from sheet stock. Conventionally, the gap between the die and punch requires tight clearances, typically 5% to 15% of material thickness. For thin sheet stock, the die and the punch must be machined within tolerances to provide the required fit.

Furthermore, certain materials are not conducive to stamping or punching. An example of difficult materials to stamp or punch is electrical steels, which, due to normal wear and tear of the stamps and dies, will eventually produce the parts with unsatisfactory edge quality or damage to (cracking of) the sheet itself. Because of the high forces that repeatedly act on the tools, the rate of wear on the tools can be quite high, thus requiring frequent refurbishment or replacement.

The tight tolerances required for stamping of thin sheets, in addition to the need to frequently refurbish or replace, makes stamping of certain materials untenable. A system and method that addresses these issues would be welcomed.

SUMMARY OF THE DISCLOSURE

Various embodiments of the disclosure describe the process of making components or parts from sheet or coil material by combining cutting, scoring and separation processes with the a flattening process. The cutting process includes cutting a partial outline of the perimeter of the component using high power energy source, such as a laser beam. The cutting process may include cutting of between 20% to 97% of the perimeter of the component. The scoring process includes scoring at least a partial outline of the component perimeter. The component perimeter is scored using high power energy source, such as a laser beam. The scoring process may include scoring of 20% to 100% of the perimeter of the component. The process of separation includes separating the component from sheet or coil, such as by a punching operation, and removing the component with compressed air or with an electromagnetic pulse.

In addition, a system and process where the scored portion of the sheet material that includes the scored lines is subjected to a flattening process prior to the punching operation is disclosed. Performing the flattening operation prior to the punching operation has the effect of streamlining the process. That is, the sheet material can be easily handled and conveyed from the scoring process and any cutting process, through the flattening process, and to the separation process without need for separate handling of the component. Such streamlining is of particular value when handling thin sheets that, in some cases, resemble foil material. Herein, "sheet material" is construed broadly to include conventional sheets, ribbons, thin plates, reels, coils and other such forms that may be processed in a stamping or through-punch operation.

The flattening process acts to return the cut and/or scored portion of the sheet material to substantially the original thickness by flattening proud features that may arise in the cutting or scoring processes, such as dross or beads of molten materials which may form at the corners of the scored grooves. The cut and/or scored portion of the sheet may undergo some degree of bowing or warping due to the temperature gradients that are incurred during the cutting and scoring processes. The flattening process may remove or diminish such bowing or warping and restore the scored portion of the sheet material to a planar state.

Another aspect of the disclosed systems and processes are that the score line establishes the location of a line of separation between the component and the sheet material during the separation process. If the separation process is conducted with rigid punch and die, tight tolerances between the punch and the die are not required to effect the desired shape of the component. This relaxes the tolerance requirements of the tooling, so that instead of 5% to 15% of the sheet material thickness, the die gaps may be one or two times the thickness of the sheet material or greater. Accordingly, the cost of tooling is reduced, and the tooling can experience greater levels of wear before requiring replacement or refurbishment. Furthermore, the rate of tool wear may be greatly reduced, as the forces required to shear the component at the score line is reduced relative to shearing the full thickness of the sheet material.

Surprisingly, we have found that, for many applications, the sequence of compressively flattening the cut and or scored portion of the sheet material before the separation process produces a finished or nearly finished component. The roughness of the edges is, for some applications, within a finished specification. Often, the dross or reformed molten material that was turned down at the corners of the cut and or scored grooves during the flattening process is pre-stressed and fatigued, and is easily removed by light finishing techniques. The components, even though produced with more generous punch and die clearances, may also retain a satisfactory planarity through the punching process.

Structurally, various embodiments of the disclosure include a scoring-assisted method for punching components from a sheet material, comprising scoring an outer score line on a sheet material with a high energy radiation source, the outer score line defining a shape of an outer perimeter of a component; after the step of scoring, flattening a scored portion of the sheet material with a flattening device, the scored portion of the sheet material including the outer score line; and after the step of flattening, driving a component punch through the sheet material to separate the component from the sheet material, the component punch contacting the sheet material within the outer score line. In some embodiments, the high energy radiation source in the step of scoring an outer score line on the sheet material is a laser.

The method may include, before the step of flattening, cutting a discard out of the sheet material with the high energy radiation source to separate the discard from the sheet material. Alternatively, in some embodiments, before the step of flattening, the method includes scoring a discard score line on the sheet material with the high energy radiation source, the discard score line defining a shape of an outer perimeter of a discard, the discard score line being surrounded by the outer score line. Before the step of driving the component punch, the method may include driving a discard punch through the sheet material to separate the discard from the sheet material, the discard punch contacting the sheet material within the discard score line. Before the step of driving the discard punch, the method may include aligning the outline with a discard die, the discard die being positioned and configured to receive the discard punch. In some embodiments, the method includes configuring the discard punch to be inserted within the discard die to define a minimum die clearance gap that is at least one and not more than three times a thickness of the sheet material.

In various embodiments, before the step of driving the component punch, the method includes aligning the outer score line with a component die, the component die being positioned and configured to receive the component punch. The method may also include configuring the component punch to be inserted within the component die to define a minimum die gap clearance that is at least one and not more than three times a thickness of the sheet material. In some embodiments, the flattening device in the step of flattening is a compressive roller. A roller pressure may be applied by the compressive roller during the step of flattening that is less than a yield strength of said sheet material.

In some embodiments, the method includes providing the sheet material having a thickness in a range of 20 micrometers to 400 micrometers inclusive. The sheet material may be of a metallic material, and may also be of an amorphous metal, and furthermore of silicone steel. In some embodiments, the step of scoring defines a groove depth that is in a range of not less than 20% and not more than 80% of a thickness of the sheet material. In some embodiments, after the step of scoring and before the step of driving, the method includes removing surface debris from the portion of the sheet material. The step of removing loose material may be performed with compressed air.

In various embodiments of the disclosure, a scoring-assisted system for manufacturing components from a sheet material is disclosed, comprising a conveyor for conveying a sheet material along a conveyance path, a high energy radiation source for forming an outer score line on the sheet material that defines a shape of an outer perimeter of a component, a flattening device for flattening the sheet material, a component punch for separating a component from the sheet material at the outer score line, and a component die configured to receive the component punch. In some embodiments, the flattening device is disposed between the high energy radiation source and the component punch along the conveyance path. The high energy radiation source may be configured for cutting a discard from within the outer score line to separate the discard from the sheet material.

Alternatively, the high energy radiation source may be configured for forming a discard score line that is surrounded by the outer score line, the discard score line defining a shape of an outer perimeter of a discard. In such embodiments, the system may include a discard punch for separating the discard from the sheet material at the discard score line, and a discard die configured to receive the discard punch, wherein the discard punch is disposed between the flattening device and the component punch along the conveyance path.

The scoring-assisted system may be configured to handle a sheet material having a thickness in a range of 20 micrometers to 400 micrometers inclusive. In some embodiments, the high energy radiation source is a laser. In some embodiments, the flattening device is a compressive roller. The compressive roller may be configured to apply a roller pressure on the sheet material that is less than a yield strength of the sheet material. The high energy radiation source may be configured to form a groove depth that is in a range of not less than 20% and not more than 80% of a thickness of the sheet material.

BRIEF DESCRIPTION OF THE DRAWINGS

FIG. 3 is an end sectional view of score line grooves before and after flattening, according to an embodiment of the disclosure;

FIG. 4 is a cutaway view of a scored tab bridging a through-cut according to an embodiment of the disclosure;

FIG. 5 is a plan view of a perforated score line according to an embodiment of the disclosure;

FIG. 6 is a side sectional view of the perforated score line of FIG. 5 according to an embodiment of the disclosure;

FIG. 7 is a side sectional view of an alternative perforated score line according to an embodiment of the disclosure;

FIG. 8 is a side sectional view of another alternative perforated score line according to an embodiment of the disclosure;

DETAILED DESCRIPTION OF THE FIGURES

Figure 1:
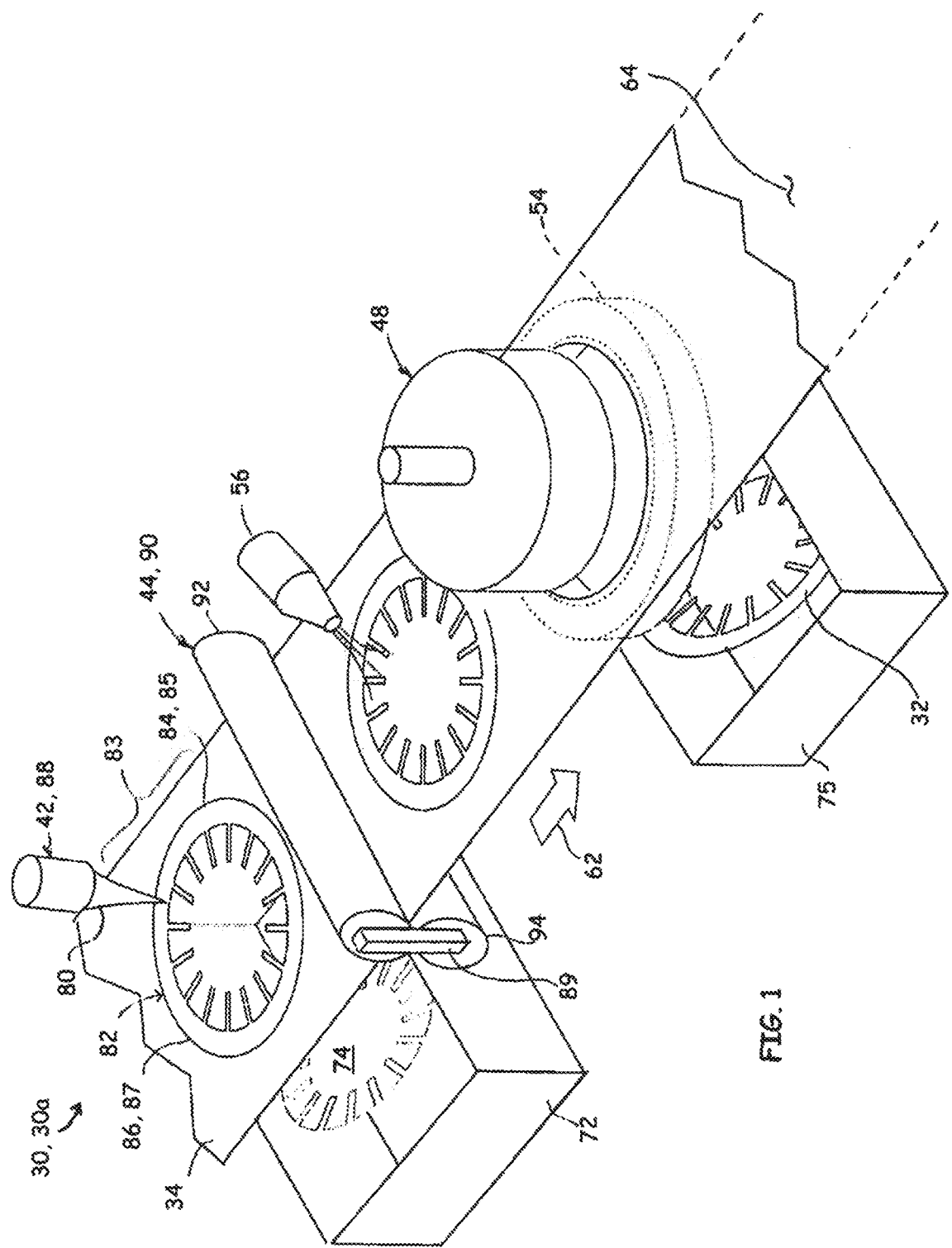
FIG. 1 is a partial perspective view of a scoring-assisted system according to an embodiment of the disclosure.

Referring to FIG. 1, a scoring-assisted system 30a for fabricating components 32 from a sheet material 34 is depicted according to an embodiment of the disclosure. In the depicted embodiment, the scoring-assisted system 30a includes a scanning radiation source 42, a sheet flattening device 44, a component punch 48, and a component die 54. Also in the depicted embodiment is an air nozzle 56 directed at the sheet material 34. A discard bin 72 may be configured to receive discards 74 that are removed from the sheet material 34 by scanning radiation source 42. The discards 74 may be a single continuous piece (depicted) or may be a plurality of pieces (e.g., a plurality of isolated apertures). Likewise, a component bin 75 may be configured to receive components 32 that are removed from the sheet material 34 by the component punch 48.

Figure 2:
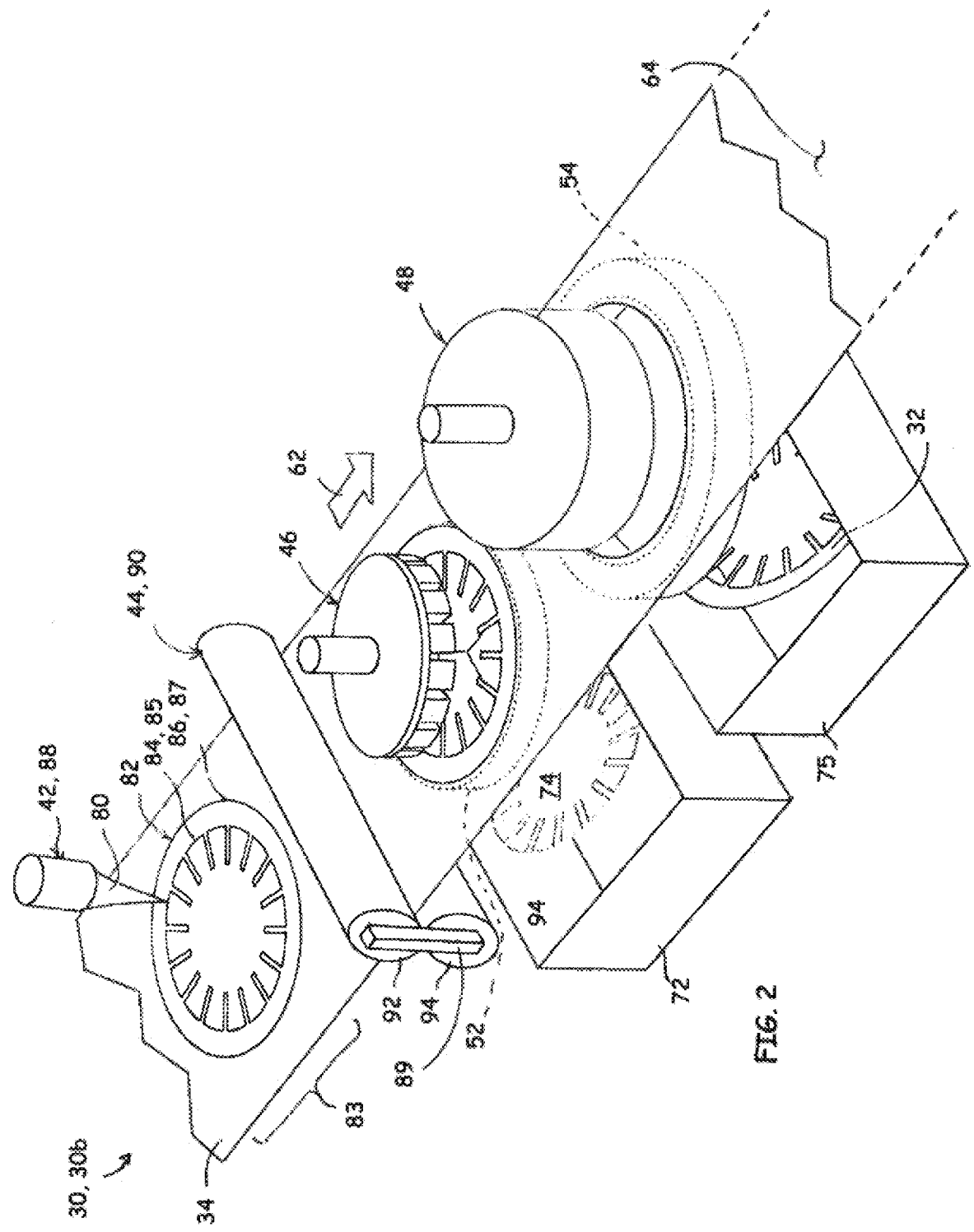
FIG. 2 is a partial perspective view of a scoring-assisted system including a discard punch and die, according to an embodiment of the disclosure.

Referring to FIG. 2, a scoring-assisted system 30b for fabricating the components 32 from the sheet material 34 is depicted according to an embodiment of the disclosure. The scoring-assisted system 30b includes many of the same components and attributes as the scoring-assisted system 30a, which are indicated with same-numbered reference characters. In addition, the scoring assisted system 30b includes a discard punch 46 and a discard die 52. The air nozzle 56 is not depicted in FIG. 2, but it is contemplated that the air nozzle 56 may be utilized in the scoring-assisted system 30b as well. For the scoring-assisted system 30b, the discards 74 are generated by actuation of the discard punch 46, so the discard bin 72 is positioned and configured to receive the discards 74 from the discard die 52.

The scoring-assisted systems 30a and 30b are herein referred to generically or collectively as scoring-assisted system(s) 30. The scoring-assisted systems 30 are configured to convey the sheet material 34 in a direction 62 along a conveyance path 64 so that a given portion of the sheet material 34 is conveyed under the scanning radiation source 42, through the sheet flattening device 44, and between the component punch 48 and component die 54 in sequence.

The scanning radiation source 42 delivers a concentrated beam of radiation 80 and may be configured to rapidly trace an outline 82 of the component 32 on the sheet material 34. Examples of rapid moving radiation sources are found, for example, at U.S. Pat. No. 9,649,727 to Kancharla and owned by the owner of the present application, the disclosure of which is hereby incorporated by reference herein in its entirety except for express definitions and patent claims contained therein. The scanning radiation source 42 may be a laser 88. The laser 88 may be either continuous wave (CW) or pulsed. A non-limiting example of a suitable laser includes a Ytterbium single-mode CW laser, such as the YLR-1000-WC-Y14 manufactured by IPG Photonics. Other single mode lasers of sufficient power, pulses or continuous wave, may be utilized. A beta radiation source (i.e., electron beam) is also contemplated for use as the scanning radiation source 42. In some embodiments, the radiation source 42 is configured to deliver power within a range of 0.5 kW (kilowatts) to 2 kW inclusive. Herein, a range that is said to be "inclusive" includes the end point values of the range as well as all intermediate values within the range.

The portion of the sheet material 34 on which the outline 82 is scored is referred to herein as the scored portion 83 of the sheet material 34. In the depicted embodiment, the outline 82 includes an inner or discard score line 84 and an outer score line 86. The inner score line 84 traces an outer perimeter 85 of the discard 74. The outer score line 86 traces an outer perimeter 87 of the component 32. The inner and outer score lines 84 and 86 combine to define the boundaries of the component 32. The scanning radiation source 42 may be configured to score the outline 82 to a desired depth within a thickness t of the sheet material 34 (e.g., FIG. 12) over multiple passes. Non-limiting examples of the desired depth of the score lines 84 and 86 is in a range of 20% to 80% inclusive of the thickness t of the sheet material 34. In some embodiments, the thickness t is in a range of 20 µm (micrometers) to 400 µm inclusive.

The air nozzle 56 may be stationed to between the sheet flattening device 44 and the component punch 48 (depicted). Alternatively, the air nozzle 56 may be stationed between the scanning radiation source 42 and the sheet flattening device 44. In some embodiments, an additional air nozzle is incorporated so that an air nozzle is stationed on both sides of the sheet flattening device 44. The air nozzle 56 may be configured to deliver an air jet in a manner that sweeps laterally across the sheet material 34 (depicted). In some embodiments, the air nozzle 56 is configured to trace over the outline 82 at close proximity to the sheet material 34. In some embodiments, the score lines 84, 86 may be cleaned of surface debris by devices and techniques other than air nozzles 56, such as brushes, air knife, or water rinse. The cleaning of surface debris may occur before the flattening process, after the flattening process, or both.

Referring to FIG. 3, the effect performing multiple passes with the scanning radiation source 42 to form the score lines 84 and 86 is depicted according to an embodiment of the disclosure. The score lines 84 and 86 define a groove 96 having a depth d within the thickness t of the sheet material 34, with a web portion 98 that bridges the sides of the groove 96. The scoring of the sheet material 34 with the concentrated beam of radiation 80 causes some reformed molten and dross material 102 to collect at corners 104 of the groove 96 and to extend proud of a surface 106 of the sheet material 34. In the depicted embodiment, some of the sheet material 34 is removed from the groove 96 by vaporization, so that the volume and mass of the reformed material 102 is only a fraction of the total of the sheet material 34 that is removed from the groove 96.

In some embodiments, the scanning radiation source 42 is configured to scan the outline 82 at a rate that is in a range from 5 ms (meters per second) to 30 ms inclusive. In some embodiments, the scanning radiation source 42 delivers radiation in a range of 0.1 kW to 2 kW inclusive. The depicted cross section of the groove 96 of FIG. 2 is a non-limiting rendering of a photograph taken of a cross-section of a sheet material 34 of mild steel of 97 µm nominal thickness that was scanned with a 1 kW laser a total of four times at a scanning rate or 20 m/s. Results for the same scoring parameters on a sheet of silicon steel were similar. For both mild steel and silicon steel, under the stated scoring conditions, the thickness of material removed from the groove 96 for each pass of the scanning radiation source 42 has been observed to be in the range of 15 µm to 35 µm inclusive, with a nominal thickness of removed material to be 16 µm to 20 µm inclusive. Data for a cutting depth of mild steel and silicone steel at varying scan rates and numbers of passes are presented below at FIGS. 16 and 17.

Functionally, by forming the score lines 84 and 86 over multiple passes, the heat affected zone of the sheet material 34 is reduced relative to that of a single pass that dwells long enough to form the groove 96. Also, because less of the energy delivered by the concentrated radiation beam 80 is absorbed by the sheet material 34, the amount of material vaporized during the successive passes may be increased relative to a single pass formation or a groove of similar depth. Also, irregularities that may be formed on the sides of the groove 96 (e.g., by reformation of dross) during initial passes may tend to be ablated away in successive passes to form a cleaner, better defined groove 96.

In some embodiments, one contour line may be completely through-cut while another contour line may be scored. Such an arrangement is depicted in scoring-assisted system 30a, where the discard 74 is completely through-cut by the scanning radiation source 42, while the outer score line 86 remains. This arrangement negates the need for the discard punch process, while leaving the component 32 attached to the sheet material 34 for conveyance along the conveyance path 62 through the sheet flattening device 44 and onto the component die 54.

Referring to FIG. 4, a scored tab configuration 100 is depicted according to an embodiment of the disclosure. In this embodiment, scoring is combined with through-cutting so that a portion or the contour line of the component 32 is cut through the thickness t of the sheet material 34 while material remains along another portion of the contour line. For example, one or both of the perimeters 85, 87 may include a through-cut portion 91 and a tab portion 93, the tab portion 93 bridging the through-cut portion 91. In some embodiments, the tab portion 93 is scored with the groove 96 in the manner depicted in FIG. 3. In some embodiments, a plurality of such tab portions 93 are formed along the perimeter(s) 85, 87. In some embodiments, a ratio of a sum of the tangential lengths 95 of the tabs 93 to a total length of the corresponding perimeter 85, 87 is in a range of 50% to 97% inclusive; in some embodiments, the ratio is in a range of 75% to 95%; in some embodiments, the ratio is in a range of 85% to 95%.

Functionally, the tabs 93 maintain coupling between the component 32 and the sheet material 34 or between the coupling 32 and discard 74 and the sheet material 34, enabling the component 32 or the combined component 32 and discard 74 to be stably conveyed along the conveyance path 64 with the sheet material 34, for positioning over the component die 54 or both the discard die 52 and the component die 54 in sequence. The reduced bridging between the discard 74 and component 32 and between the component 32 and sheet material 34 relative to a conventional stamping process reduces the required separation forces. In embodiments where the tab portions 93 are scored, the forces are further reduced and the line of separation may be predictable within a tighter tolerance than with tab portions 93 that are not scored.

In the depicted embodiment, the sheet flattening device 14 is a roller assembly 90 that includes opposed rollers 92, 94 on opposing sides of the sheet material 34. The opposed rollers 92, 94 may be coupled to roller mounts 89 that are configured to limit separation of the rollers 92, 94 at a maximum predetermined distance. In some embodiments, the maximum separation of the rollers 92, 94 is set to be at least the nominal thickness t of the sheet material and no greater than 1 μm more than the nominal thickness t. In some embodiments, the roller mounts 89 are configured to provide rigid separation of the rollers 92, 94. Contact of each roller 92, 94 with the sheet material 34 may be established by an electrical contact measurement. In some embodiments, the rollers 92, 94 are of a hard metallic material. In some embodiments, the rollers 92 and 94 operate at different electrical potentials, thereby causing a current to flow through the sheet material 34 during conveyance through the roller assembly 90.

Functionally, limiting the separation between the rollers 92, 94 to a maximum dimension at the nominal thickness t or rigidly maintaining the separation at the nominal thickness t of the sheet material 34 enables the roller assembly 90 to perform the flattening function without exerting substantial stresses on the core of the sheet material. As the scored portion 83 of the sheet material passes through the roller assembly 90, only the proud features relative to the surface 106, such as the reformed molten and dross material 102 at the corners 104 (FIG. 3), exceed the nominal thickness t of the sheet material 34 and come into compressive contact with the rollers 92, 94. Because the separation between the rollers 92, 94 do not exceed or are held constantly at the nominal thickness t, the reformed molten and dross material 102 will yield locally to the rollers 92, 94, resulting in plastic deformation that turns these features down.

Accordingly, the scored portions 83 of the sheet material are flattened without generating substantial Hertzian contact stresses. Hertzian contact theory characterizes the stresses generated by the contact of curved stresses, and is described, for example, at Xiaoyin Zhu, "Tutorial on Hertz Contact Stress", available at https: wp.optics.arizona.edu.optomech.wp-content/uploads.sites.53 2016 10.OPTI-521-Tutorial-on-Hertz-contact-stress-Xiaoyin-Zhu.pdf, last visited on Mar. 27, 2018, the disclosure of which is incorporated by reference herein in its entirety except for express definitions contained therein. Excessive Hertzian contact stresses are known, for example, to adversely affect the magnetic properties of materials.

Alternatively, the roller assembly 90 may be a compressive roller configured to compress the sheet material 34 therebetween using a predetermined force as the sheet material 34 is conveyed through the roller assembly 90. Compression between the rollers 92, 94 may be accomplished, for example, with hydraulic actuators (not depicted). The predetermined force generated by the roller assembly 90 may be tailored to deliver stresses on the sheet material 34 that do not exceed the yield strength of the material. Because the reformed molten and dross material 102 stands proud relative to the surface 106 of the sheet material 34 and constitutes a small fraction of the total line contact of the roller assembly 90, the local stresses on the reformed molten and dross material 102 will far exceed the average stress on the sheet material 34, thereby preventing deformation of the core of the sheet material 34 while still providing flattening (plastic deformation) of the reformed molten and dross material 102. In some embodiments, the roller assembly 90 is configured to apply a compressive force on the sheet material 34 only when the sheet material 34 is moving through the roller assembly 90. Alternatively, the flattening device 44 may include a flat stamping plate (not depicted), a rocking press (not depicted), or other devices and techniques for flattening sheet material available to the artisan.

The effect of flattening the sheet material 34 after scoring but prior to punching is also depicted in FIG. 3 according to an embodiment of the disclosure. The sheet material 34 is advanced through the roller assembly 90 so that the reformed material 102 is flattened (i.e., made substantially planar with the surface 106). For some materials, such as mild steel and amorphous silicon steel, the reformed material 102 is relatively ductile, so that the reformed material is turned down at the corners 104. Also, some reformed material that is tenuously attached to the corners 104 may be pre-stressed and fatigued or fractured and detached during the flattening process. Operating the rollers 92, 94 at different potentials may provide local heating of the sheet material 34 to augment the flattening process. The electrical current also interacts with the core of the component 32 to augment plastic deformation desirable in the flattening process.

Accordingly, to "flatten" the sheet material 34 is to compress or return the reformed molten and dross material 102 to be substantially at or within the original thickness t of the sheet material 34, and to mitigate bowing and warping of the sheet material. That is, the sheet material 34 will still define the outline 82 after the flattening process. The flattening process does not compress the sheet material 34 to the point of eliminating the score lines 82 and 84.

In some embodiments, the compressive force is applied by the roller 90 only when the sheet material 34 is advanced therethrough. By applying the compressive force with the roller assembly 90 only when the sheet material 34 is passing through the roller assembly 90, the system avoids dimpling of the sheet material 34 that may otherwise occur as the material dwells momentarily within the rollers 92, 94.

Referring to FIGS. 5 through 8, a perforated score line 108 is depicted in an embodiment of the disclosure. The perforated score line 108 is characterized as having perforations 110 formed along the length of the web portion 98 within the groove 96. In some embodiments, at least a portion of one or both of the discard score line 84 and the outer score line 86 of the score outline 82 is formed with such perforated score lines 108. The perforated score line 108 may be formed over multiple passes as discussed above. In FIGS. 5 and 6, the score outline 82 is initially formed as being continuous and of substantially uniform depth, followed by bursts of radiation energy at discrete points along the length of the groove 96 to form the perforations 110. In some embodiments, only the perforations are formed by the scanning radiation source 42 (FIG. 7). That is, the scoring-assisted systems 30 are configured so that the scanning radiation source 42 delivers bursts of radiation only at the desired locations of the perforations 110 to form a discontinuous scoring outline 82. In some embodiments, the scan rate is undulated so that the concentrated radiation beam 80 dwells or passes more slowly over the regions where the perforations 110 are to be formed (FIG. 8). After formation of the perforated score line 108, the sheet material 34 with score lines 82 and 84 thus formed may be compressively flattened as described above.

Functionally, the perforations 110 serve to reduce the forces required to separate the components 32 or the discards 74 or both from the sheet material 34. Any dross material that may be formed along the boundaries of the perforations 110 may be flattened or removed by the flattening device 44 in the same manner as the corners 104 described above. The perforations 110 may also serve to limit the effect of tearing or ripping along the lines of separation and to keep the lines of separation centered along the web portion 98, so that the nominal peripheries of the components 32 are substantially uniform.

Figure 9:
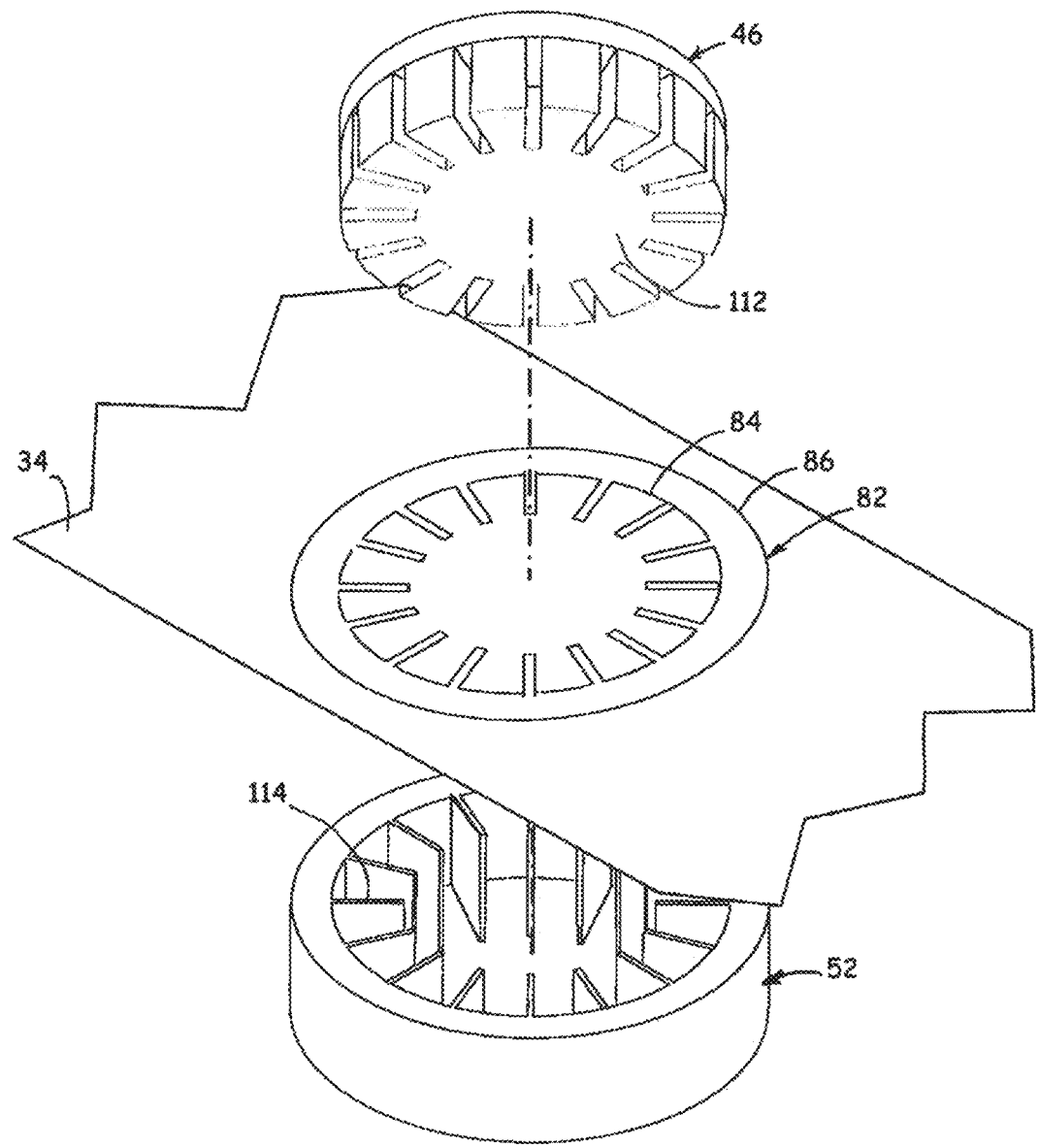
FIG. 9 is a perspective view of a discard punch and a discard die in alignment with a scored section of a sheet material, according to an embodiment of the disclosure.

Referring to FIG. 9, the discard punch 46 and discard die 52 are depicted according to an embodiment of the disclosure. The discard punch 46 and discard die 52 are so-named because they function to remove the discards 74 from the sheet material 34 that is not part of the finished component 32. The discard punch 46 may define a footprint 112 that approximates but is within the inner or discard score line 84 of the discards 74. The discard die 52, when utilized, is configured to receive the discard punch 46 and may define a footprint 114 that approximates but is within the discard score line 84 of the outline 82.

Figure 10:
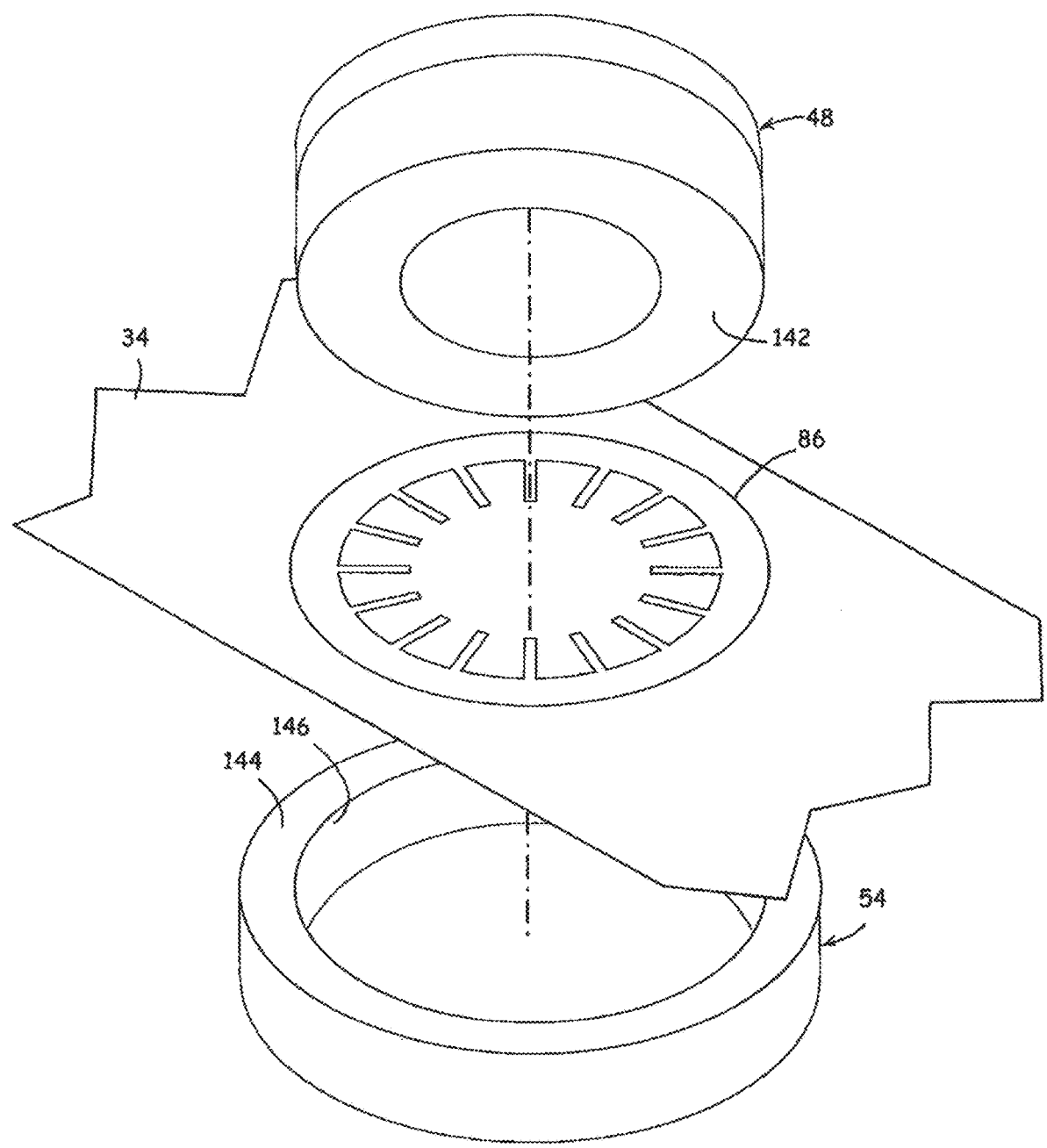
FIG. 10 is a perspective view of a component punch and a component die in alignment with a scored section of a sheet material with a discard removed, according to an embodiment of the disclosure.

Referring to FIG. 10, the component punch 48 and component die 54 are depicted according to an embodiment of the disclosure. The component punch 48 and component die 54 are so-named because they function to remove the components 32 from the sheet material 34. The component punch 48 may define a footprint 142 that approximates but is within the outer score line 86 of the components 32. The component die 54, when utilized, is configured to receive the component punch 48 and may define a footprint 144 that approximates but is outside the outer score line 86 of the outline 82. In the depicted embodiment, the outer score line 86, and therefore a receptacle 146 of the component die 54, are circular.

In some embodiments, the punches 46 and 48 and the dies 52 and 54 are made of a rigid material (e.g., tooling steel) that contacts the sheet material 34. In some embodiments, some or all of the punches 46 and 48 and the dies 52 and 54 include a semi-rigid or a flexible material that contacts the sheet material 34, such as polyurethane or rubber-like materials. The semi-rigid or flexible material may be disposed on or integrated with the discard punch 46 or discard die 52, for example, in an overmolding process.

Figure 11:
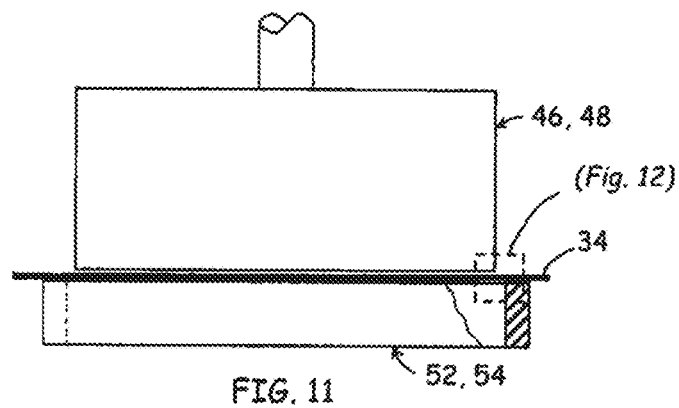
FIG. 11 is an elevational, partial cutaway view of a punch centered over a sheet material and a die, according to an embodiment of the disclosure.
Figure 12:
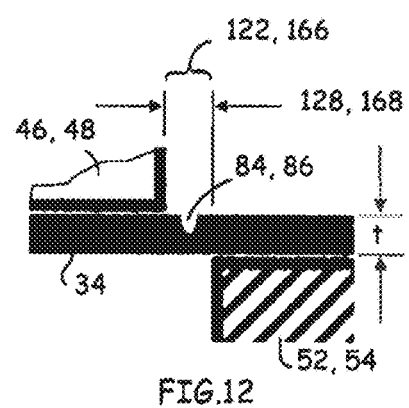
FIG. 12 is an enlarged, partial view of the cutaway of FIG. 11 depicting a die clearance gap, according to an embodiment of the disclosure.
Figure 13:
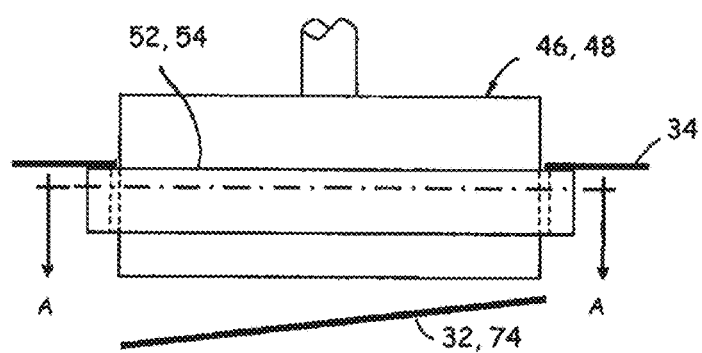
FIG. 13 is an elevational view of a punch inserted through the sheet material and into the die of FIG. 11, according to an embodiment of the disclosure.

Referring to FIGS. 11 through 15, operation of the discard punch 46 and discard die 52 and of the component punch 48 and component die 54 are depicted according to an embodiment of the disclosure. As operation of the discard punch 46 and discard die 52 is similar to the operation of the component punch 48 and component die 54, FIGS. 11 through 13 are annotated to depict the operation of both of these punch and die combinations. After the component 32 has been scored with the scanning radiation source 42, the inner or discard score line 84 of the outline 82 of the component 32 is aligned over the discard die 52 to define a die clearance gap 122 between the discard punch 46 and the discard die 52 (FIGS. 11 and 12). The scoring-assisted systems 30 may be configured so that the score lines 82 and 84 are in the same rotational orientation as the discard punch 46 and discard die 52, such that the discard score line 84 is positioned over the die clearance gap 122 by translating the outline 82 over the discard die 52. When the component outline 82 is aligned with the discard die 52, the discard score line 84 traces over the die clearance gap 122.

Figure 14:
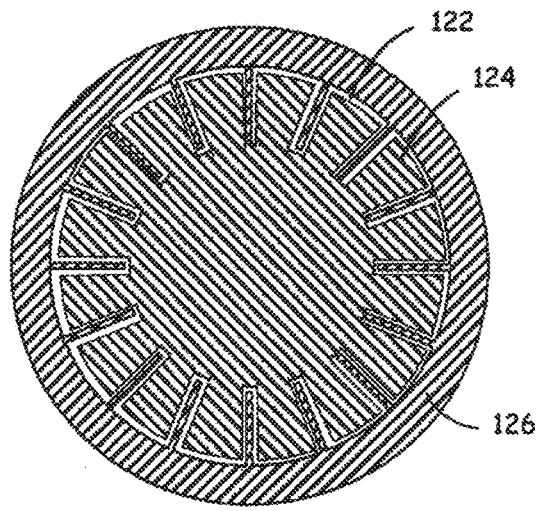
FIG. 14 is a sectional view at plane A-A of FIG. 13 for a discard punch inserted in a discard die according to an embodiment of the disclosure.

The discard punch 46, which aligns within the discard score line 84, is then thrust through the sheet material 34 to separate the discard 74 from the sheet material 34 (FIG. 13) at the discard score line 84. During the separation of the discard 74, the discard punch 46 is inserted at least partially into the discard die 52. A cross-sectional view of the discard punch 46 within the discard die 52 is presented at FIG. 14, depicting a discard punch cross-section 124 and a discard die cross section 126. In some embodiments, the die clearance gap 122 is defined laterally between the discard punch 46 and the discard die 52 when the discard punch 46 is inserted into the discard die 52. In some embodiments, a minimum dimension 128 for the die clearance gap 122 is at least one and not more than three times the thickness t of said sheet material 34.

Figure 15:
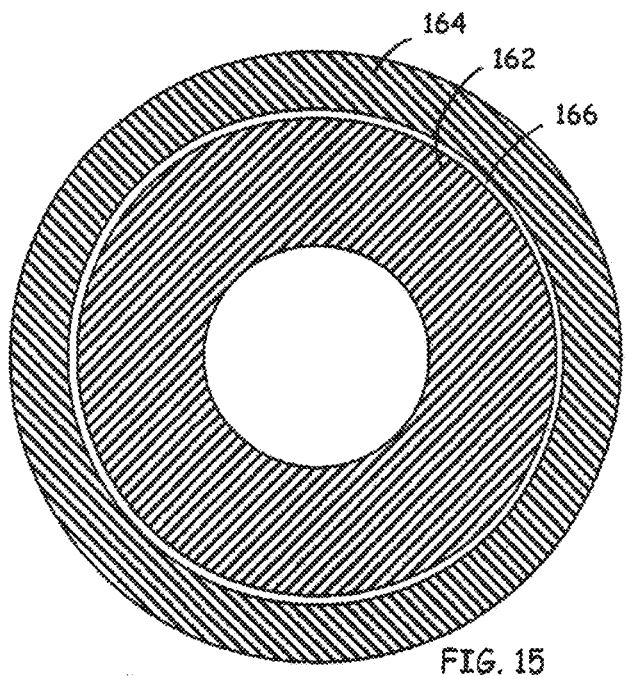
FIG. 15 is a sectional view at plane A-A of FIG. 13 for a component punch inserted in a component die according to an embodiment of the disclosure.

After the discard 74 has been removed from the sheet material 34, the outer score line 86 of the outline 82 is aligned over the component die 54, the component 32 being radially suspended at the outer score line 86. When in alignment, the component punch 48 and the component die 54 define a die clearance gap 162, over which the outer score line 86 is positioned (FIGS. 11 and 12). The component punch 48 is then thrust through the sheet material 34 to separate the component 32 from the sheet material 34 (FIG. 13) at the outer score line 86, so that the component 32 drops into the component bin 75. During the separation of the component 32, the component punch 48 is inserted at least partially into the component die 54. A cross-sectional view of the component punch 48 within the component die 54 is presented at FIG. 15, depicting a component punch cross-section 162 and a component die cross section 164. A continuous, die clearance gap 166 is defined between the component punch 48 and the component die 54. In some embodiments, a minimum dimension 168 for the die clearance gap 16 is at least one and not more than three times a thickness t of the sheet material 34.

Functionally, the score outline 82 controls the line of separation in both the discard 74 and component 32 punching processes in the scoring-assisted system 30b. and controls the line of separation of the component 32 in the scoring-assisted system 30a. This is in contrast to a conventional stamping process, where the line of separation is controlled by tight tolerances between tool and die. Accordingly, the tolerances between the component punch 48 and the component die 54 and, when utilized, between the discard punch 46 and the discard die 52 may be more generous. Because of the compressive rolling process that occurs after scoring and any cutting process but before the punching operation(s), at least the flatness of the component 32 is in a finished state upon separation from the sheet material 34. The edges of the components 32 may then be finished to final specifications, for example by sand blasting, turning, milling, grinding, honing, electrical erosion, or other finishing processes available to the artisan.

Figure 16:
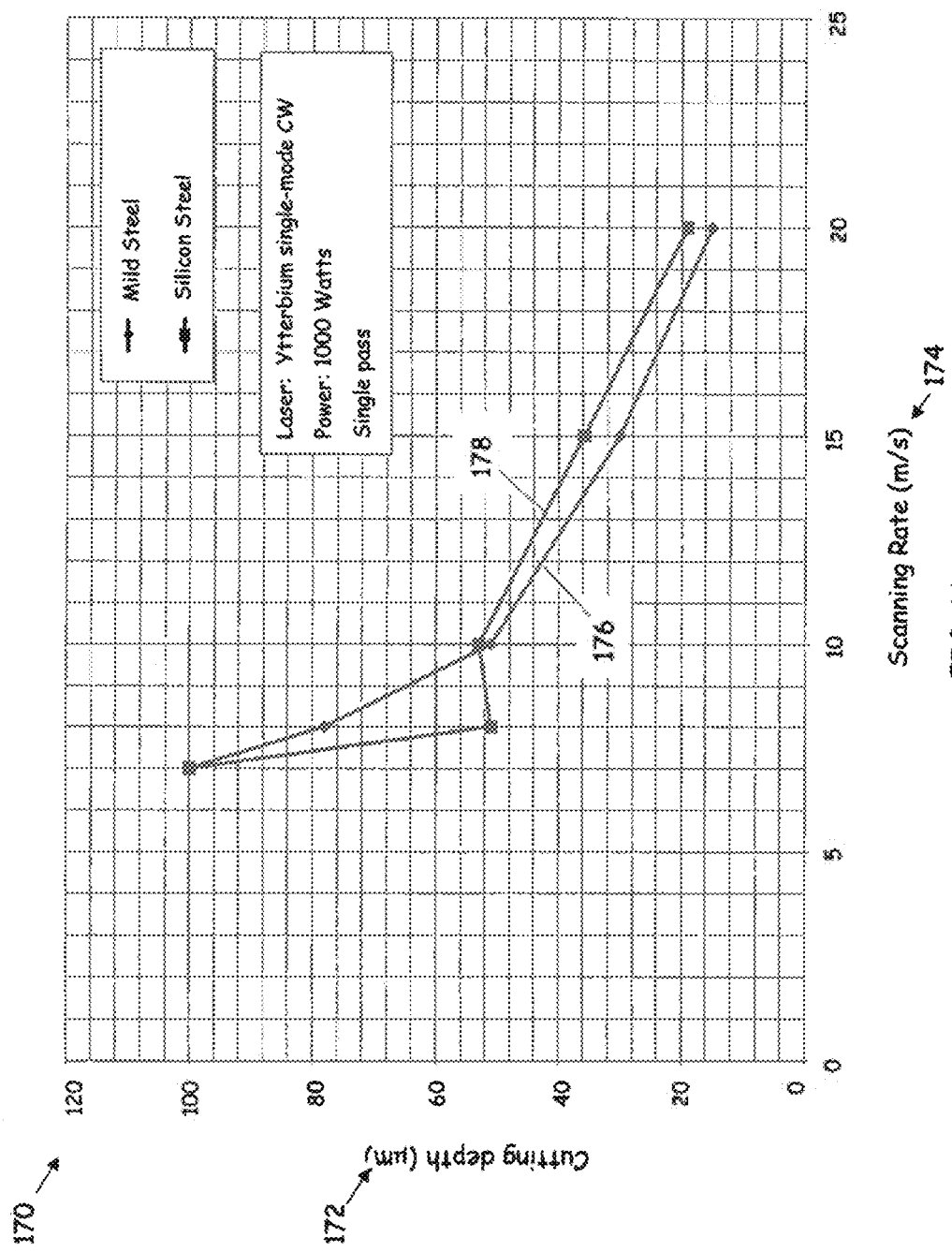
FIG. 16 is a graph of a cutting depth of a groove versus a scanning rate for a single pass of a 1 kilowatt Ytterbium single-mode continuous wave cutting laser according to an embodiment of the disclosure.

Referring to FIG. 16, a graph 170 of data characterizing a cutting depth parameter 172 of a groove versus scanning rate (cutting speed) 174 of a laser is presented according to an embodiment of the disclosure. The data were obtained in an experimental setup using an IPG Photonics YLR-1000-WC-Y14 Ytterbium single-mode CW laser at a power level 1000 Watts utilizing a fiber diameter of 14 µm. The laser was scanned with an IPG 2D High Power Scanner with a 200 mm collimator and a 254 mm focus lens. The focus spot diameter was calculated at 18 µm. The tests were performed at an ABB IRB2400 robot work station in a stationary scanner set up. The tests were performed on a vacuum honeycomb cutting table with an air knife purge directed on the process area. The tests were performed on mild steel sheet stock and silicon steel sheet stock of 100 µm nominal thickness. Mild steel data 176 and silicon steel data 178 are presented in the graph 170.

Data were taken for a single pass of the cutting laser at scanning rates of 7.0, 8.0, 10.0, 15.0, and 20.0 ms. The graph 170 demonstrates that cutting depth is reduced as the scanning rate is increased, and that results were substantially similar for mild steel and silicon steel. It was also observed that less dross material was formed along the boundaries at higher scanning rates.

Figure 17:
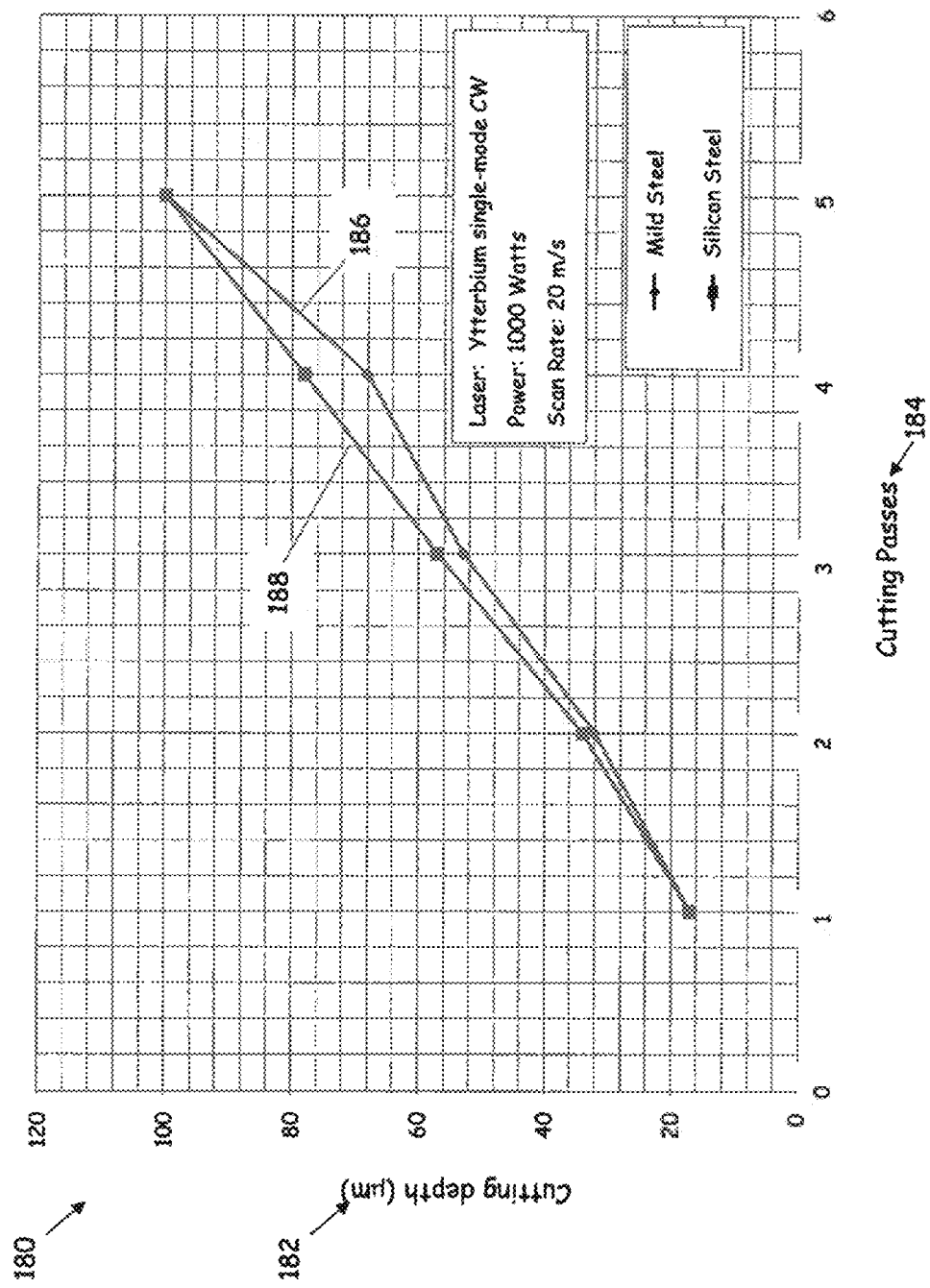
FIG. 17 is a graph of a cutting depth of a groove versus a number of passes for a 1 kilowatt Ytterbium single-mode continuous wave cutting laser at a scanning rate of 20 meters per second according to an embodiment of the disclosure.

Referring to FIG. 17, a graph 180 of data characterizing a cutting depth parameter 182 of a groove versus the number of passes 184 of a laser is presented according to an embodiment of the disclosure. The data were obtained in an experimental setup using an IPO Photonics YLR-1000-WC-Y14 Ytterbium single-mode CW laser at a power level 1000 Watts utilizing a liber diameter of 14 µm. The laser was scanned with an IPG 2D High Power Scanner with a 200 mm collimator and a 254 mm focus lens. The focus spot diameter was calculated at 18 µm. The tests were performed at an ABB IRB2400 robot work station in a stationary scanner set up. The tests were performed on a vacuum honeycomb cutting table with an air knife purge directed on the process area. The tests were performed on mild steel sheet stock and silicon steel sheet stock of 100 µm nominal thickness. Mild steel data 186 and silicon steel data 188 are presented in the graph 180.

Data were taken at a scanning rate of 20 ms for the cutting laser at with the number of passes ranging from 1 to 5 inclusive. The graph 180 demonstrates that increasing the number of passes also increases the cutting depth, and that results were substantially similar for mild steel and silicon steel. It was also observed that complete cut through of the stock material was achieve at 5 passes at the 20 ms scanning rate.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Unless indicated otherwise, references to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(1) are not to be invoked unless the specific terms "means for" or "step for" are recited in the respective claim.

What is claimed is:

1. A scoring-assisted system for manufacturing components from a sheet material, comprising:
   a conveyor for conveying a sheet material along a conveyance path;
   a high energy radiation source for forming an outer score line on said sheet material that defines a shape of an outer perimeter of a component;
   a flattening device for flattening a scored portion of said sheet material;
   a component punch for separating the component from said sheet material at said outer score line; and
   a component die configured to receive said component punch,
   wherein said flattening device is disposed between said high energy radiation source and said component punch along said conveyance path.

2. The s of claim 1, wherein said high energy radiation source is configured for co ag a discard from within said outer score line to separate said discard from said she material.

3. The scoring-assisted system of claim 1, wherein said high energy radiation source is configured for forming a discard score line that is surrounded by said outer score line, said discard score line defining a shape of an outer perimeter of a discard.

4. The scoring-assisted system of claim 3, comprising:
a discard punch for separating said discard from said sheet material at said discard score line; and
a discard die configured to receive said discard punch,
wherein said discard punch is disposed between said flattening device and said component punch along said conveyance path.

5. The scoring-assisted system of claim 1, wherein the scoring-assisted system is configured to handle sheet material having a thickness in a range of 20 micrometers to 400 micrometers inclusive.

6. The scoring-assisted system of claim 1, wherein said high energy radiation source is a laser.

7. The scoring-assisted system of claim 1, wherein id flattening device is a compressive roller.

8. The scoring-assisted stem of claim 7, wherein said compressive roller is configured to apply a roller pressure on said sheet material that is less than a yield strength of said sheet material.

9. The scoring-assisted system of claim 1, wherein said high energy radiation source is configured to form a groove depth that is in a range of not less than 20% and not more than 80% of a thickness of said sheet material.

* * * * *